(12) United States Patent
Camoglu et al.

(10) Patent No.: US 8,751,481 B2
(45) Date of Patent: Jun. 10, 2014

(54) ADAPTIVE MULTI-CHANNEL CONTENT SELECTION WITH BEHAVIOR-AWARE QUERY ANALYSIS

(75) Inventors: Orhan Camoglu, San Francisco, CA (US); Wahid Chrabakh, Fremont, CA (US); Lei Ding, Pleasanton, CA (US); Jingheo Miao, San Jose, CA (US); Divyakant Agrawal, Goleta, CA (US); Neeraj Bhatnagar, Fremont, CA (US); Tao Yang, Santa Barbara, CA (US)

(73) Assignee: IAC Search & Media, Inc., Oakland, CA (US)

( * ) Notice: Subject to any disclaimer, the term of this patent is extended or adjusted under 35 U.S.C. 154(b) by 779 days.

(21) Appl. No.: 12/148,190

(22) Filed: Apr. 16, 2008

(65) Prior Publication Data
US 2009/0265325 A1    Oct. 22, 2009

(51) Int. Cl.
G06F 17/30 (2006.01)
(52) U.S. Cl.
USPC ................... 707/713; 707/722; 707/736
(58) Field of Classification Search
USPC ............................ 707/722, 713, 736
See application file for complete search history.

(56) References Cited

U.S. PATENT DOCUMENTS

| | | | |
|---|---|---|---|
| 2005/0004889 A1* | 1/2005 | Bailey et al. | 707/1 |
| 2006/0036581 A1* | 2/2006 | Chakrabarti et al. | 707/3 |
| 2006/0224496 A1* | 10/2006 | Sandholm et al. | 705/37 |
| 2007/0192309 A1* | 8/2007 | Fischer et al. | 707/5 |
| 2007/0233671 A1* | 10/2007 | Oztekin et al. | 707/5 |
| 2007/0260624 A1* | 11/2007 | Chung et al. | 707/101 |
| 2007/0288473 A1* | 12/2007 | Mukherjee et al. | 707/10 |
| 2007/0294225 A1* | 12/2007 | Radlinski et al. | 707/3 |
| 2008/0016040 A1* | 1/2008 | Jones et al. | 707/3 |
| 2008/0033982 A1* | 2/2008 | Parikh et al. | 707/102 |
| 2008/0154870 A1* | 6/2008 | Evermann et al. | 707/4 |
| 2008/0172374 A1* | 7/2008 | Wolosin et al. | 707/5 |
| 2008/0201413 A1* | 8/2008 | Sullivan et al. | 709/203 |
| 2008/0222283 A1* | 9/2008 | Ertugrul et al. | 709/224 |
| 2008/0250035 A1* | 10/2008 | Smith et al. | 707/100 |

* cited by examiner

*Primary Examiner* — Son T Hoang
(74) *Attorney, Agent, or Firm* — Stephen M. De Klerk

(57) ABSTRACT

Preferred embodiments of the invention include systems and methods for selecting content from a plurality of channels in response to a received query are described. The invention embodiments include systems and methods that optimize content selection based on received queries and an identification of the user together with analysis of historical data. Embodiments of the invention also include methods for storing historical data including a plurality of queries and user data from a plurality of user databases, analyzing the stored historical data to classify the relevancy of a channel to each of the plurality of queries and user data, storing the classification, and displaying content to user based on such factors as user habits, queries, timing of searches, and content preferences.

10 Claims, 16 Drawing Sheets

ADAPTIVE MULTI-CHANNEL CONTENT SELECTION WITH BEHAVIOR-AWARE QUERY ANALYSIS

FIELD

Embodiments of this invention relate to the field of search engines and, in particular, to systems and methods for adaptive multi-content channel selection.

BACKGROUND

The Internet is a global network of computer systems and websites. These computer systems include a variety of documents, files, databases, and the like, which include information covering a variety of topics. It can be difficult for users of the Internet to locate this information on the Internet.

Search engines are used by most people to locate this information on the Internet. Users also often use search engines to answer simple questions. Thus, search engines also desire to provide a service which provides answers to these simple questions.

Often, the search results are presented on a results page that aggregates information from multiple channels. For example, the web results associated with the search query are often presented along with advertisements and other similar information.

SUMMARY

Embodiments of the invention relate to a method including receiving a search query from a user; identifying web search results corresponding to the search query; optimizing content selection from a plurality of channels based on the query and the user; and presenting the web search results and selected content from the plurality of channels to the user.

Optimizing content selection from a plurality of channels based on the query and an identification of the user may include optimizing content selection from a plurality of channels based on the query, the user, and a time range. The time range may be an event.

Optimizing content selection from a plurality of channels may include analyzing historical data based on the query and the user.

The historical data may include past click results of the user. The historical data may include past click results associated with the query.

The method may also include identifying query concepts from the received query; analyzing historical data based on each of the query concepts to determine a recommended channel selection; and aggregating the recommended channel selection for each of the query concepts.

Optimizing content selection from a plurality of channels based on the query and an identification of the user may include dynamically determining a recommended channel selection.

The method may also include determining a recommended amount of information from each recommended channel.

Embodiments of the invention also relate to a system including a web search engine; and a channel selection system coupled with the web search engine.

The system may also include a plurality of databases, the plurality of databases coupled with the web search engine and the channel selection system.

The system may also include a plurality of channels coupled with the channel selection system over a network.

The plurality of databases, the web search engine and the channel selection system may be located within a web search server.

At least one of the plurality of databases may include historical data about a plurality of users of the system and a plurality of queries received at the web search engine. At least one of the plurality of databases may include vertical information.

Embodiments of the invention also relate to a method including storing historical data including a plurality of queries and user data from a plurality of users in a database; analyzing the stored historical data to classify a relevancy of a channel to each of the plurality of queries and user data; and storing the classification.

The method may also include receiving a search query from a user and analyzing the received query.

Analyzing the received query may include partitioning the received query to identify concept blocks; classifying each concept block to determine a classification decision; aggregating the classification decision of each concept block; and computing a channel relevancy for the query.

Analyzing the received query may include deriving the probability of click for a channel based on the user and the received query; and computing a channel relevancy for the query.

Deriving the probability of click for a channel may include deriving the probability of click based on an access time range.

The method may also include determining a recommendation of channels based on the computed channel relevancy.

Analyzing the stored historical data to determine a recommendation of a channel selection may include determining an amount of information from each recommended channel.

Other features of the present invention will be apparent from the accompanying drawings and from the detailed description which follows.

BRIEF DESCRIPTION OF THE DRAWINGS

The invention is described by way of example with reference to the accompanying drawings, wherein:

FIGS. 3A-B are schematic drawings of a user interface for presenting search results in accordance with one embodiment of the invention;

FIG. 13 is a schematic drawing of a user interface illustrating a search results page for a first exemplary query in accordance with one embodiment of the invention;

FIG. 14 is a schematic drawing of a user interface illustrating a search results page for a second exemplary query in accordance with one embodiment of the invention.

DETAILED DESCRIPTION

Figure 1:
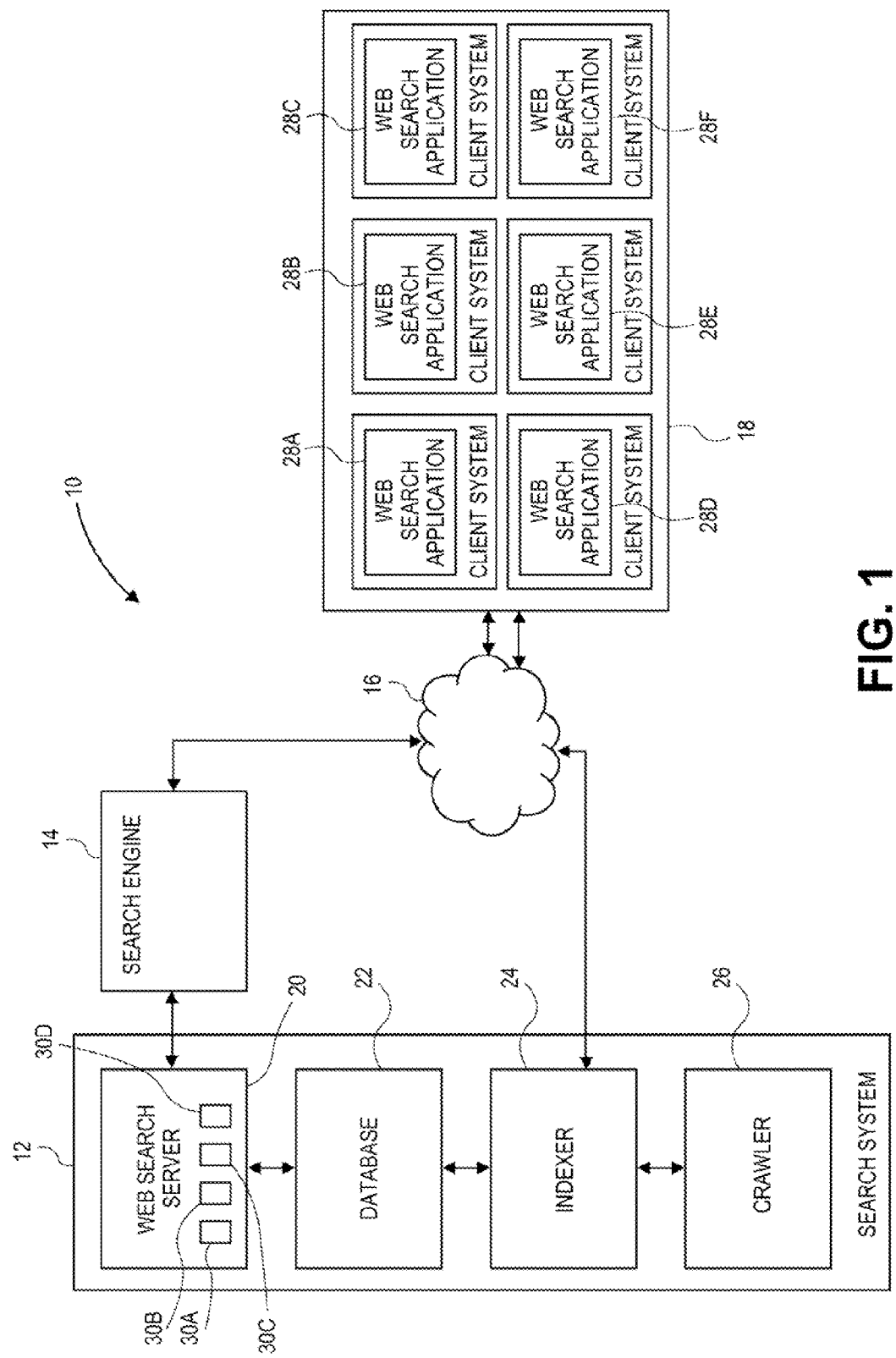
FIG. 1 is a block diagram illustrating a system for natural language service searching in accordance with one embodiment of the invention.

FIG. 1, of the accompanying drawings, shows a network system 10 which can be used in accordance with one embodiment of the present invention. The network system 10 includes a search system 12, a search engine 14, a network 16, and a plurality of client systems 18. The search system 12 includes a server 20, a database 22, an indexer 24, and a crawler 26. The plurality of client systems 18 includes a plurality of web search applications 28a-f, located on each of the plurality of client systems 18. The server 20 includes a plurality of databases 30a-d.

The server 20 is connected to the search engine 14. The search engine 14 is connected to the plurality of client systems 18 via the network 16. The server 20 is in communication with the database 22 which is in communication with the indexer 24. The indexer 24 is in communication with the crawler 26. The crawler 26 is capable of communicating with the plurality of client systems 18 via the network 16 as well.

The web search server 20 is typically a computer system, and may be an HTTP server. It is envisioned that the search engine 14 may be located at the web search server 20. The web search server 20 typically includes at least processing logic and memory.

The indexer 24 is typically a software program which is used to create an index, which is then stored in storage media. The index is typically a table of alphanumeric terms with a corresponding list of the related documents or the location of the related documents (e.g., a pointer). An exemplary pointer is a Uniform Resource Locator (URL). The indexer 24 may build a hash table, in which a numerical value is attached to each of the terms. The database 22 is stored in a storage media, which typically includes the documents which are indexed by the indexer 24. The index may be included in the same storage media as the database 22 or in a different storage media. The storage media may be volatile or non-volatile memory that includes, for example, read only memory (ROM), random access memory (RAM), magnetic disk storage media, optical storage media, flash memory devices and zip drives.

The crawler 26 is a software program or software robot, which is typically used to build lists of the information found on Web sites. Another common term for the crawler 26 is a spider. The crawler 26 typically searches Web sites on the Internet and keeps track of the information located in its search and the location of the information.

The network 16 is a local area network (LAN), wide area network (WAN), a telephone network, such as the Public Switched Telephone Network (PSTN), an intranet, the Internet, or combinations thereof.

The plurality of client systems 18 may be mainframes, minicomputers, personal computers, laptops, personal digital assistants (PDA), cell phones, and the like. The plurality of client systems 18 are characterized in that they are capable of being connected to the network 16. Web sites may also be located on the client systems 18. The web search application 28a-f is typically an Internet browser or other software.

The databases 30a-d are stored in storage media located at the server 20. The storage media may be volatile or non-volatile memory that includes, for example, read only memory (ROM), random access memory (RAM), magnetic disk storage media, optical storage media, flash memory devices and zip drives.

In use, the crawler 26 crawls websites, such as the websites of the plurality of client systems 18, to locate information on the web. The crawler 26 employs software robots to build lists of the information. The crawler 26 may include one or more crawlers to search the web. The crawler 26 typically extracts the information and stores it in the database 22. The indexer 24 creates an index of the information stored in the database 22. Alternatively, if a database 22 is not used, the indexer 24 creates an index of the information and where the information is located in the Internet (typically a URL).

When a user of one of the plurality of client systems 18 enters a search on the web search application 28, the search is communicated to the search engine 14 over the network 16. The search engine 14 communicates the search to the server 20 at the search system 12. The server 20 accesses the index and/or database to provide a search result, which is communicated to the user via the search engine 14 and network 16.

Alternatively or in addition to accessing the index and/or database to provide the search result, the databases 30a-d can be searched, as will be described hereinafter.

Figure 2:
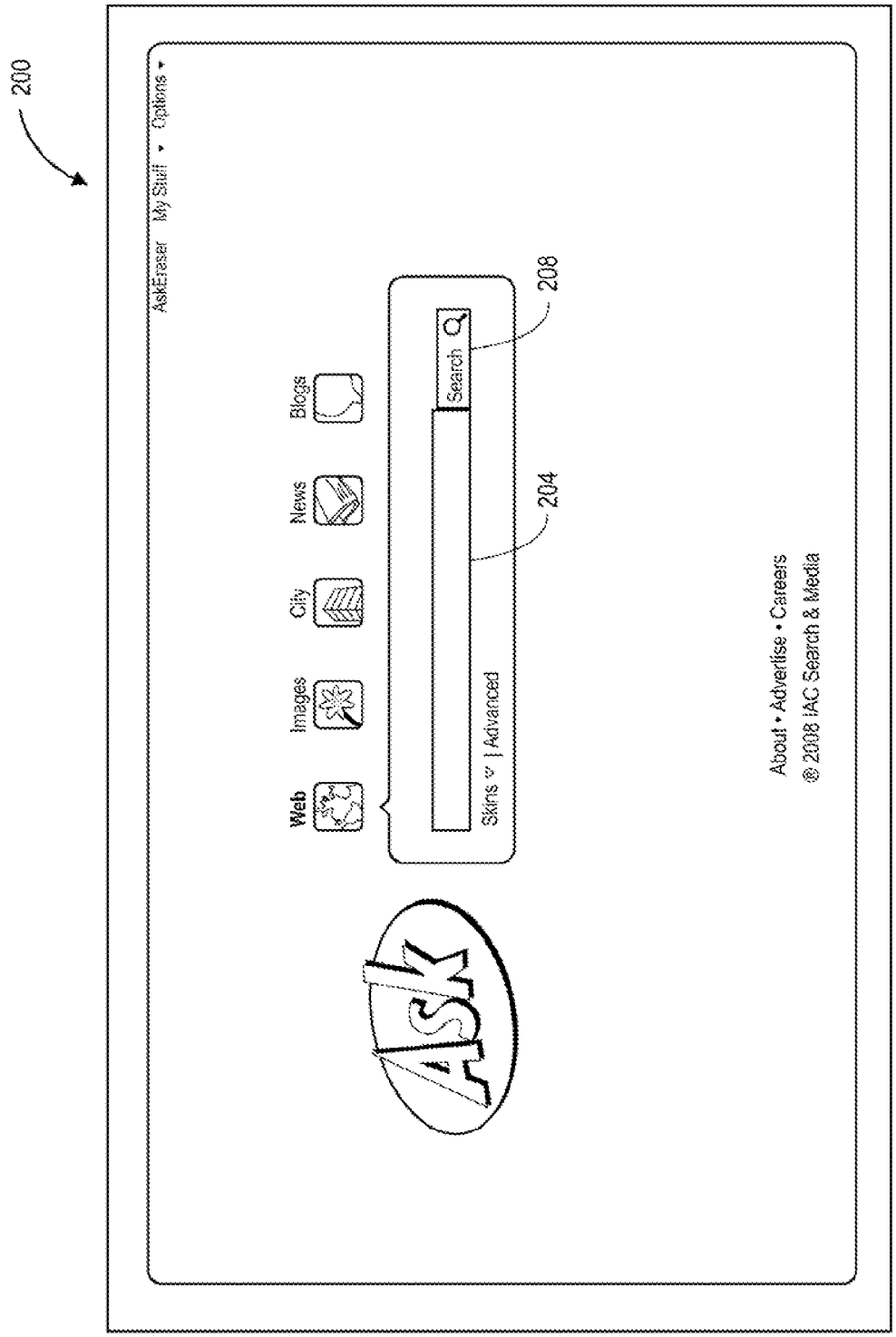
FIG. 2 is a schematic drawing of a user interface for entering a search query in accordance with one embodiment of the invention.

FIG. 2 illustrates an exemplary user interface 200. The illustrated user interface 200 includes a user input box 204 and a button 208. The user input box 204 is configured to receive textual user input. The button 208 is designated by "Search" in FIG. 2 and is configured to be selectable by the user. A user accesses the interface 200 to enter a search query in the user input box 204. The user presses the "enter" key on a keyboard or selects (e.g. mouse clicks, mouses over, etc.) the button 208. Selection of the button 208 or pressing the "enter" key on a keyboard results in a communication of the text entered in the input box 204 from the client system 18 to the search engine 14 and the search system 12.

Figure 3A:
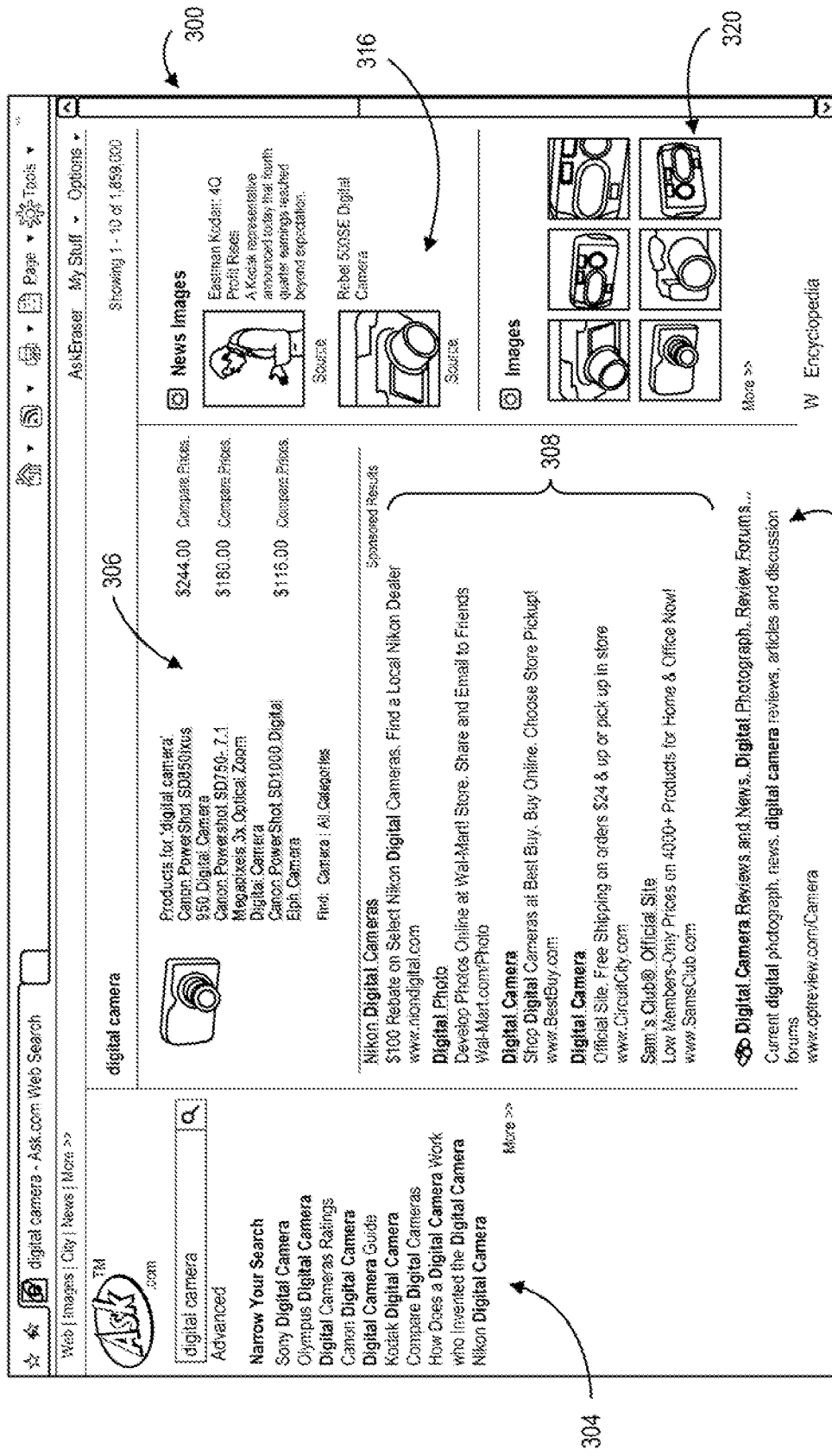
Figure 3B:
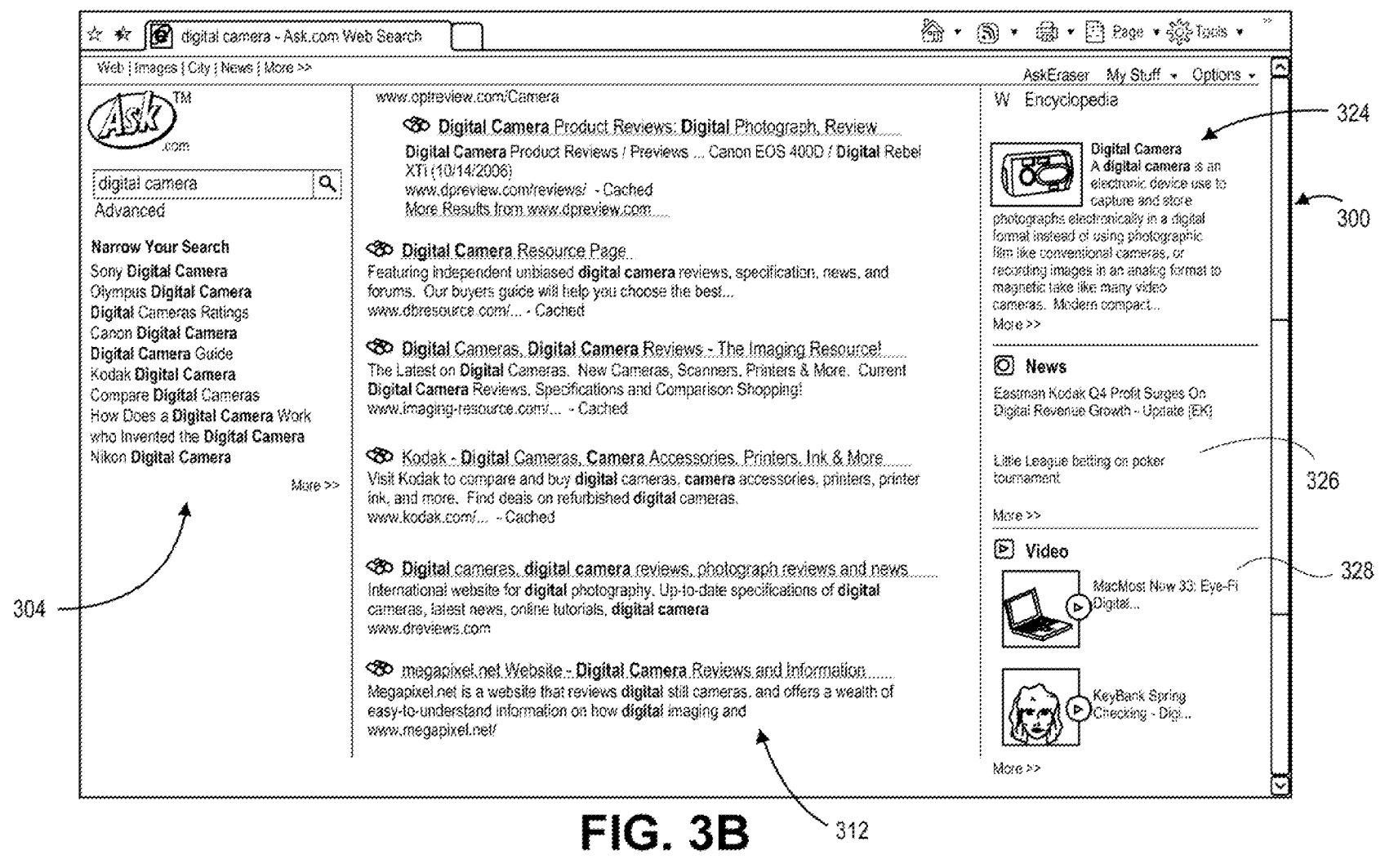

FIGS. 3A and 3B illustrate an exemplary search results page 300. FIGS. 3A and 3B together form the same results page 300, but views of the page from different scrolling points. It will be appreciated that the results pages of FIGS. 3A and 3B would typically appear as a single page on the user's web application.

The illustrated search results page 300 includes several regions including a suggested search term region 304, an advertisements region 306, a sponsored results region 308, a web results region 312, a news images region 316, an images region 320, an encyclopedia region 324, a news region 326 and a video region 328. Each of the advertisements region 306, sponsored results region 308, news images region 316, images region 320, encyclopedia region 324, news region 326 and video region 328 are representative of different channels of information (e.g., advertisements, sponsors, news images, images, news, encyclopedia, video, etc.). It will be appreciated that the channels presented are not limited to the above channels and may include a fewer number or greater number of channels. In addition, the amount of information from each channel may vary from that illustrated.

The different channels of information are sometimes referred to as vertical information and some or all of the channels of information may come from vertical databases. This information may be located at the search system (e.g., one or more of databases 30a-d) or may be received from other servers (not shown) connected to the search system over a network. The results of the web search engine, an advertisement engine and special information channel engines (or combined advertisement and special information channel engine) are combined to determine the channels to be used and the composition of the page presented to the user (e.g., search results page 300 of FIGS. 3A and 3B).

While each source of channel information can provide a large amount of information in responding to a query, the overall display space of a results page is limited. In addition, information from each channel may not be relevant to each query. Similarly, the quality of results tends to degrade when an excessive amount of information is supplied from a specific channel. For example, the top three results of a web search may be more relevant to a query than the bottom three results. Similarly, in another example, the top result of an advertisement link is often more relevant than the second or third advertisement links.

Embodiments of the present invention relate to optimization in selecting content from multiple channels, even though the engines behind these channels may come from different organizations and service providers. The search system combines information from independent information providers. The search system determines the relationship among the different channels. The search system can optimize channel selection even though the web search engine does not have direct access to information in backend channel providers.

In one embodiment, the channel selection is a contextual optimization of multi-channel information selection using user behavior and/or query context analysis. For example, the web search engine increases the amount of content selected from one specific channel if such content is more attractive to users and optimizes the overall content acceptance of the composed query responses.

In another embodiment, the web search engine suppresses content from a channel. For example, in certain query categories, users tend to be more interested in commercial products; thus, the number of sponsored advertisement links can be increased for such users and reduced for a category that has less relation to money, while maintaining the overall advertisement inventory consumption, resulting in increased user satisfaction and, therefore, improved user retention.

The search system optimizes content selection from multiple channels adaptively based on a user's query, the user's recent clicks, and/or user's recent pick behavior on selected channels. The search system identifies user-contexts in which a user is more or less likely to click on a specific channel. The search system can then retrieve more or less content depending on the users to determine the relevancy of the information. The search system, therefore, increases user satisfaction towards the selected content.

Figure 4:
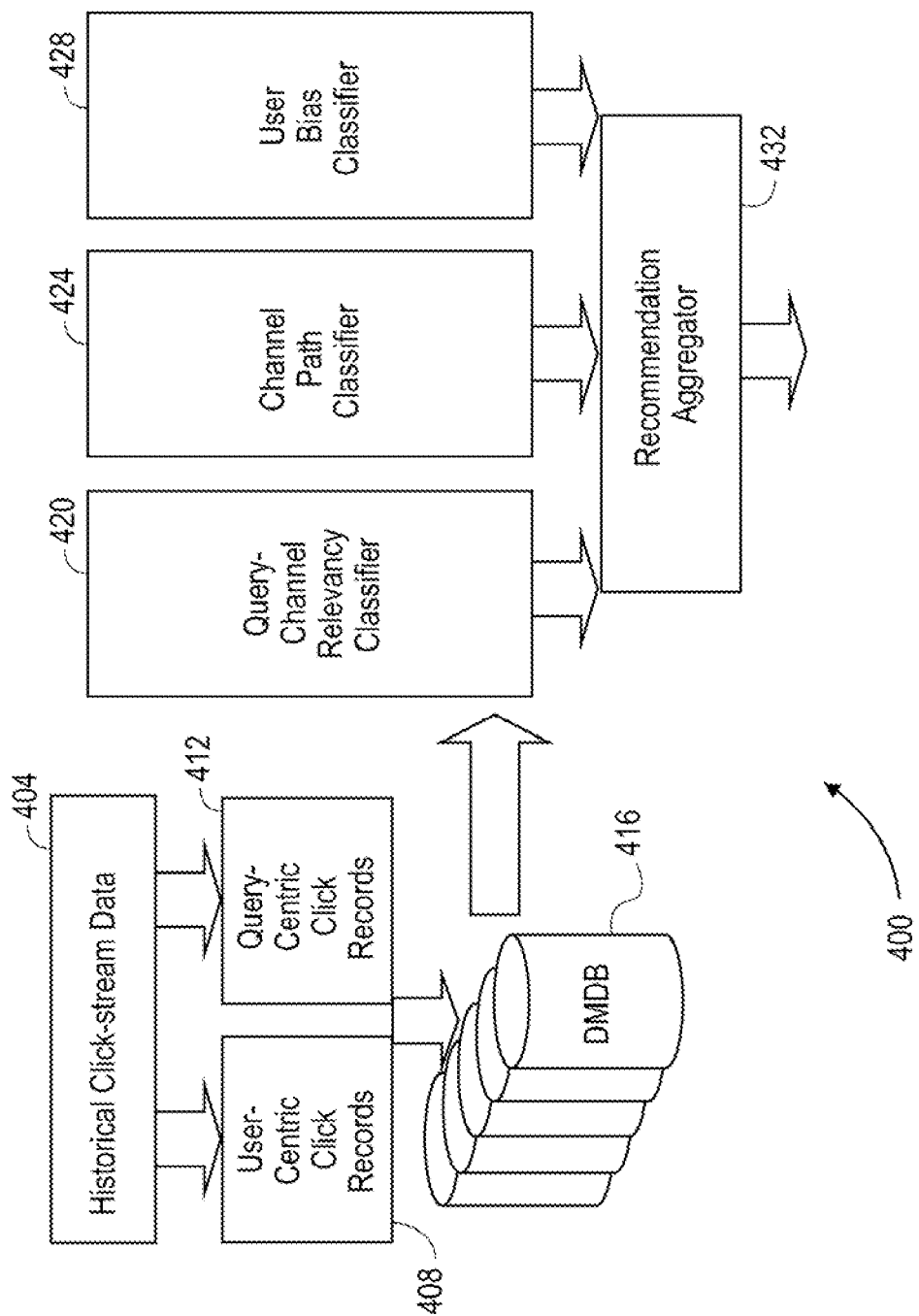
FIG. 4 is a block diagram of a mining and classification system in accordance with one embodiment of the invention.

FIG. 4 illustrates a system 400 for mining and classifying data. The system 400 may be part of the search system 12 of FIG. 1. The illustrated system 400 is configured to track and mine user profiles and preferences for use of each channel based on a user's historical data, track and mine relevancy information appropriateness of each data channel for a given query and a user, or a group of users under different categories, track and mine click path among these channels, and optimize channel placement for best retention and pick rates for targeted channels.

The system 400 includes historical click-stream data 404, user-centric click records 408, query-centric click records 412, a DMDB (Data Mining DataBase) 416, a query-channel relevancy classifier 420, a channel-path classifier 424, a user bias classifier 428 and a recommendation aggregator 432.

The historical click-stream data 404 is collected from a data log feed. The data 404 is inserted into the DMDB 416 along with user-centric click records 408 and query-centric click records 412. The information in DMDB 416 is used as training data to develop independent classifiers (e.g., query-channel relevancy classifier 420, channel path classifier 424, user bias classifier 428).

The query-channel relevancy classifier 420 is configured to analyze the categorization of queries into groups, such as, for example, shopping, auto, finance, health, education, etc. The queries can also be grouped into query sessions. A query session includes any sequence of search engine actions (activities that can be recorded by the search engine) of a given user.

The query-channel relevancy classifier 420 is also configured to determine the access path from one channel to another. For example, a user that accesses information associated with a "Dictionary" channel to learn the meaning of words is less likely to read advertisement content from an advertisement channel. The query classifier identifies the relevance degree of each channel's content to a query or a class of queries, which can potentially encourage the acceptance of its content for a user or a group of users.

The user bias classifier 428 is configured to analyze users classified by, for example, geolocations, a user's past preference for specified channels, whether the user accesses several channels, whether a user never accesses certain channels, whether the user is a new user, whether the user is a frequent user, whether the user is a casual user, and the like.

The user bias classifier 428 is also configured to analyze users based on their access times and events in selecting certain channels. Exemplary access times include, for example, morning, evening, nights, weekends, weekdays, etc. Exemplary events include holidays and major events, such as the Super Bowl, 9/11, Christmas, etc.

The recommendation aggregator 432 is configured to dynamically collect live data for instant recommendation channel resources based on the classification results from the query-channel relevancy classifier 420, channel-path classifier 424 and user bias classifier 428 along with runtime behavior tracking.

The recommendation aggregator 432 computes a recommendation value F for increasing or decreasing use of content from a targeted channel under conditions Q, T and U (i.e., $F(Q, T, U)$, where Q is a query, or a class of queries; T is time of access or an event; and, U is a user or class of users.

Figure 5:
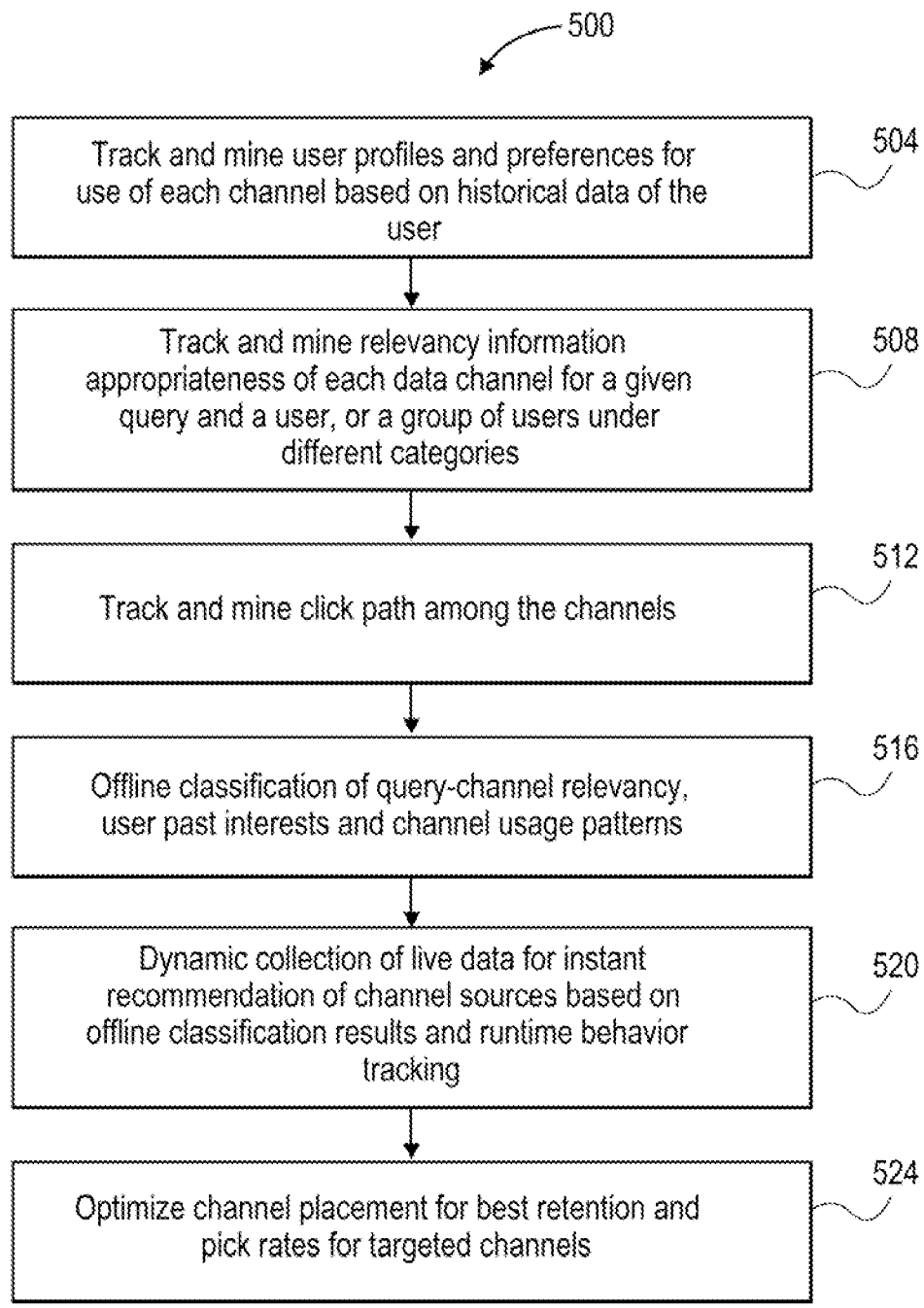
FIG. 5 is a block diagram of a method of mining and classifying in accordance with one embodiment of the invention.

FIG. 5 is a flow diagram illustrating a method associated with the system of FIG. 4 in further detail. The method 500 begins at block 504 by tracking and mining user profiles and preferences for use of each channel based on historical data of the user. The method 500 continues by tracking and mining relevancy information appropriateness of each data channel for a given query and a user, or a group of users under different categories (block 508). The method 500 continues by tracking and mining click, path among channels (block 512). The method 500 continues by offline classification of query-channel relevancy, user past interests and channel usage patterns (block 516). The method 500 continues by dynamic collection of live data for instant recommendation of channel sources based on offline classification results and runtime behavior tracking (block 520). The method 500 continues by optimizing channel placement for best retention and pick rates for targeted channels (block 524).

Figure 6:
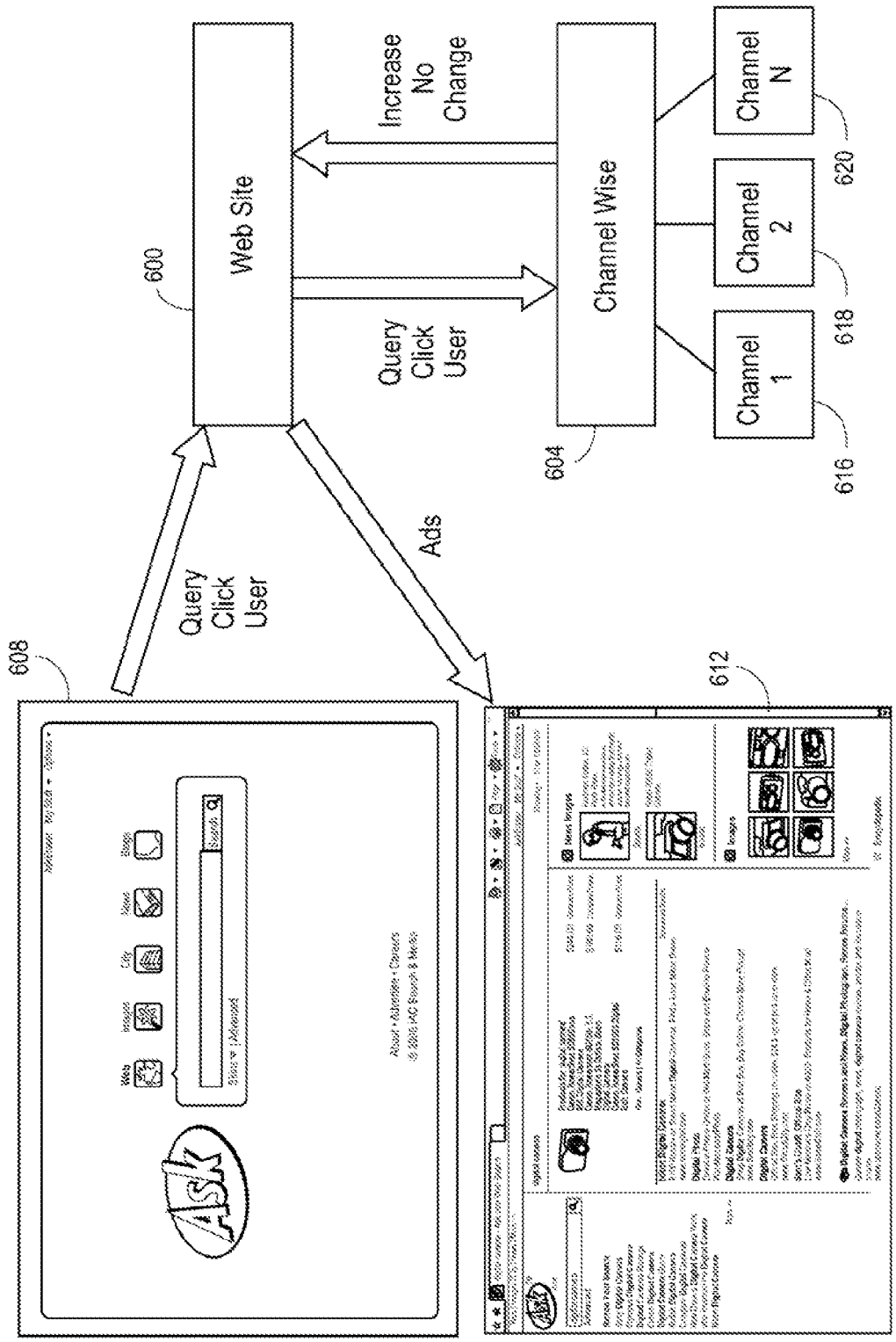
FIG. 6 is a block diagram of a channel selection search engine in accordance with one embodiment of the invention.

FIG. 6 schematically illustrates interaction between the search engine 600, the channel wise 604 (a channel selection system) and the user interfaces 608, 612. The channel wise 604 is also coupled with channels 616, 618 and 620. For example, the information channel 1, 616, may be an advertisement channel, the information channel 2, 618, may be a dictionary channel and the information channel n, 620, may be any information channel, such as, for example, an encyclopedia channel, an images channel, a news images channel, a sponsored results channel, etc. It will be appreciated that any number or combination of channels may be provided. It will also be appreciated that some of the channels may be located at the search system while others are located external the search system. For example, information channel 1 616 may be located in a database 30a of the search system 12 of FIG. 1, while information channels 618 and 620 may be coupled to the search system 12 through the network 16.

The user interface 608 corresponds to an interface in which the user enters a search query for the search engine. The search query is communicated to the search engine web site 600. The web site 600 communicates the user query to the channel wise 604. The channel wise 604 determines an optimized content channel selection based on the user and the query, and communicates the result to the web site 600. For example, channel wise 604 may indicate that an increase or no change in the channel content should be performed by the web site 600. The web site 600 then provides the user with the search results and information from the selected channels with the user interface 612.

In one embodiment, the channel wise 604 is co-run within the web site 600. In one embodiment, a web server front end captures the contextual information needed to trigger the recommendation from the channel wise 604. For example, the contextual information may include one or more of query text, prior click history and user ID. The channel wise 604 generates its recommendation based on, for example, the F(Q,T,U) function and provides the recommendation to the web site 600. The web site 600, in turn, provides the recommended amount of information to the user from the recommended channels.

Figure 7:
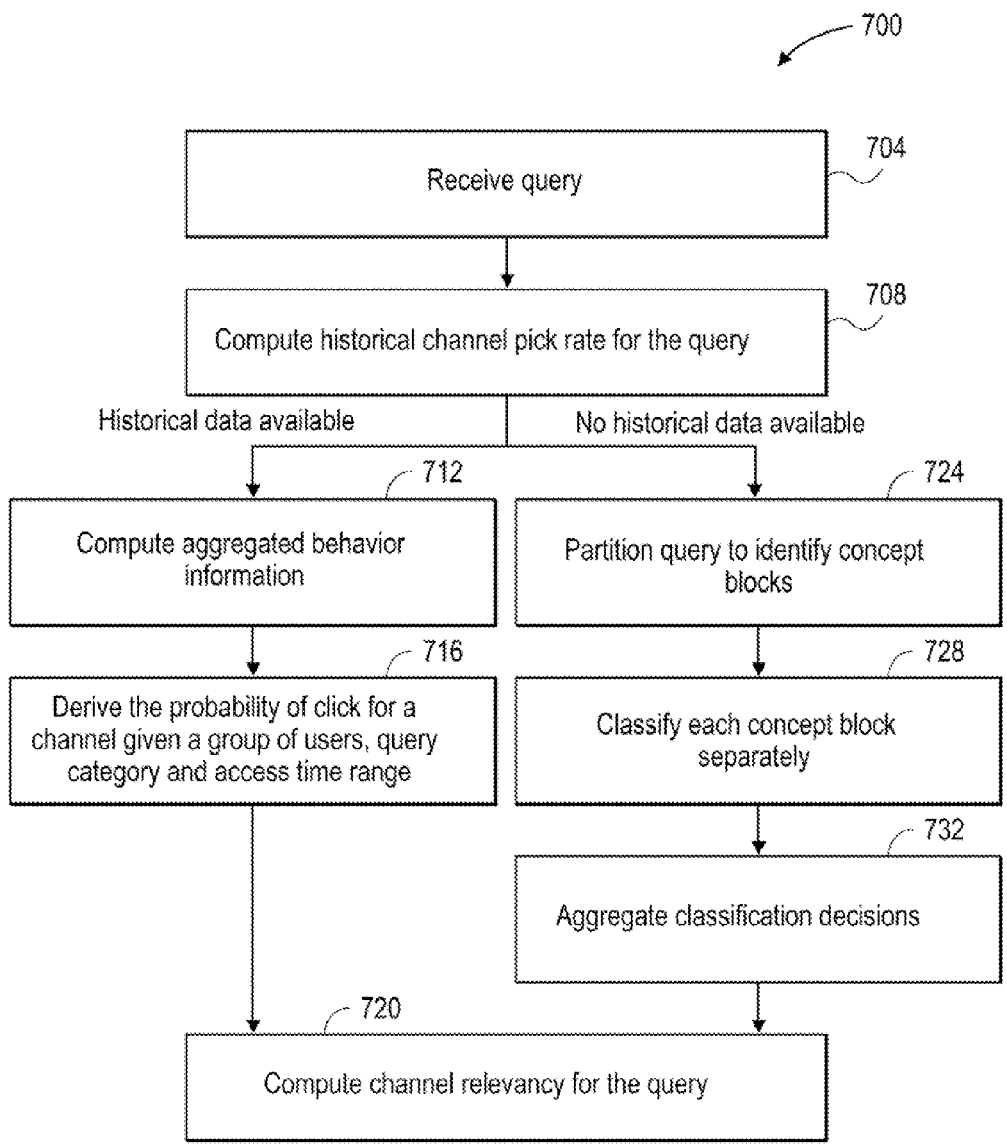
FIG. 7 is a block diagram of a method for determining a channel relevancy for a query in accordance with one embodiment of the invention.

FIG. 7 illustrates a method of contextual optimization of content selection 700 in accordance with one embodiment of the invention. The method 700 begins by receiving a query (block 704).

The method 700 continues by computing a historical channel pick rate for the query (block 708). For example, if many users in the past click results presented from a specific channel, the past click results indicate relevancy of content from the selected channel(s) for the given query. The aggregated behavior information is computed for the tuple (Q, U, T), in which Q is a query, U is a user and T is a time or event.

If historical data is available, the method 700 continues by computing aggregated behavior information (block 712) and deriving the probability of click for a channel given a group of users (or a user), query category (or a query) and access time range (block 716). The method 700 continues by computing channel relevancy for the query (block 720).

If historical data is not available, the method 700 continues by partitioning the query to identify concept blocks (block 724). Although some queries may not be found in the historical data database, parts of a new query (i.e., sub-queries or concept blocks) may have been submitted in the past. The channel relevancy of these sub-queries or concept blocks can be used to estimate the channel relevancy for the new query as a whole.

The method 700 continues by classifying each concept block separately (block 728). The concept blocks may include, for example, special phrases, words, bi-grams, tri-grams, k-grams, and the like. Stemming techniques, for example, can be applied in concept block extraction. The method 700 continues by aggregating classification decisions (block 732). The method 700 continues by computing channel relevancy for the query (block 720).

Thus, for a set of query contexts (query or block concepts) in the historical data, the following tuples: <Query or Query Group, Number of past clicks, User Group, Time Range (or Event)> are extracted for each channel.

Figure 8:
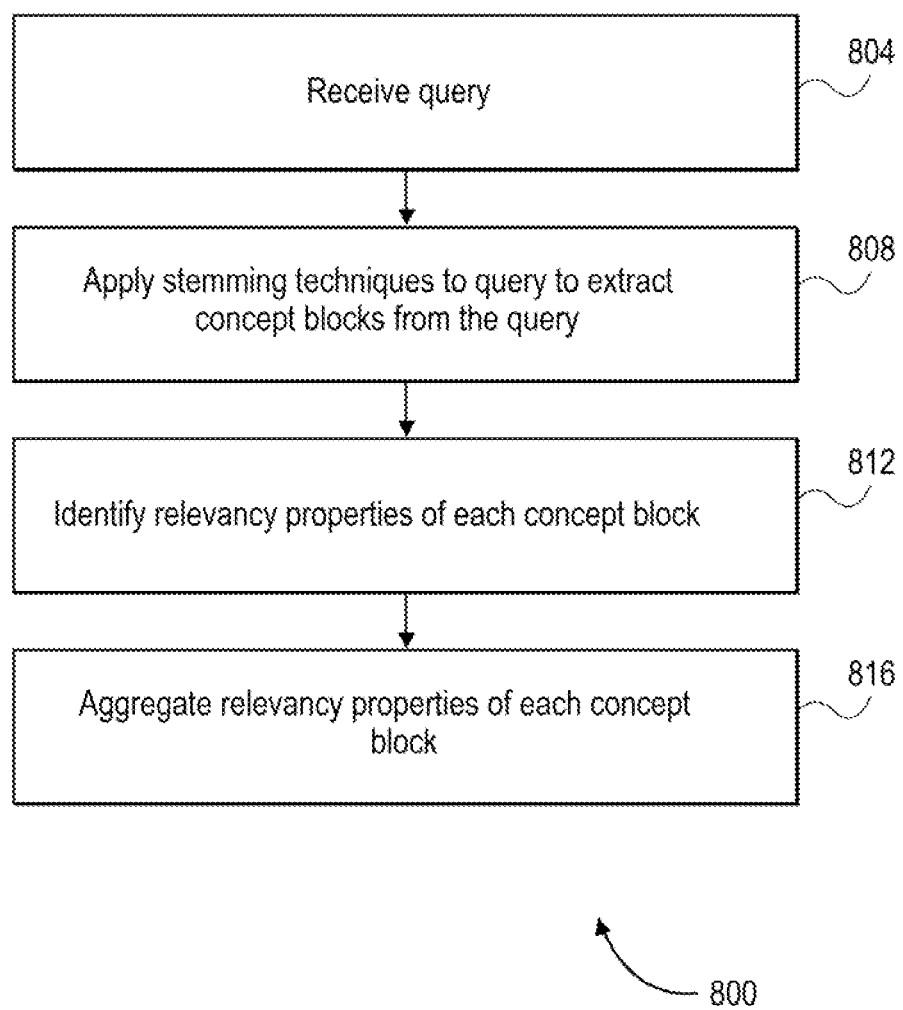
FIG. 8 is a block diagram of a method for query partitioning in accordance with one embodiment of the invention.

FIG. 8 illustrates the method of extracting concept blocks 800 in further detail. The method 800 begins by receiving a query (block 804). The method 800 continues by applying stemming techniques to the query to extract concept blocks from the query (block 808). The method 800 continues by identifying relevancy properties of each concept block (block 812). The method 800 continues by aggregating relevancy properties of each concept block (block 816).

Figure 9:
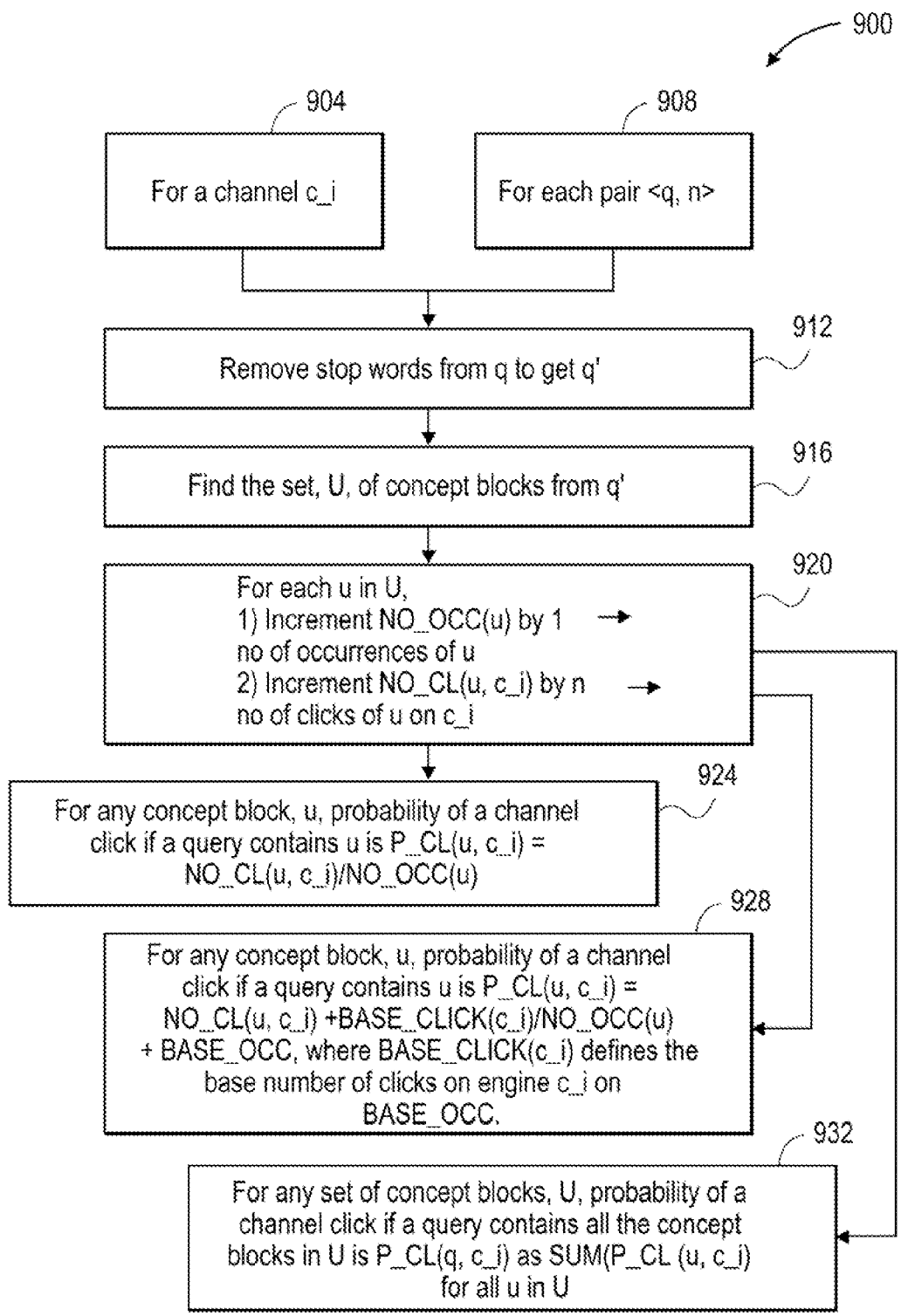
FIG. 9 is a block diagram of a method for computing a channel relevancy degree in accordance with one embodiment of the invention.

FIG. 9 illustrates a method 900 for computing the channel relevancy degree of each concept block in a dataset for each user group and a time range in accordance with one embodiment of the invention. The method 900 begins by for a channel $c\_i$ (block 904) and for each pair <q, n>(block 908), removing stop words from q to get q' (block 912). Channel $c\_i$ corresponds to a channel, q is a query, n is the number of clicks associated with a query, q is a query and q' is a searchable query.

The method 900 continues by finding the set, U, of concept blocks from q' (block 916).

The method 900 continues by for each u in U, incrementing NO_OCC(u) by 1 and incrementing NO_CL(u, $c\_i$) by n (block 920), wherein NO_OCC(u) is the number of occurrences of u and NO_CL(u, $c\_i$) is the number of clicks of u on $c\_i$.

In one embodiment, the method 900 continues by for any concept block, u, the probability of a channel click if a query contains u is P_CL(u, $c\_i$)=NO_CL(u, $c\_i$)/NO_OCC(u) (block 924).

In another embodiment, the method 900 continues by for any concept block, u, the probability of a channel click if a query contains u is P_CL (u, $c\_i$)=NO_CL(u, $c\_i$)+BASE_CLICK($c\_i$)/NO_OCC(u)+BASE_OCC, where BASE_CLICK($c\_i$) defines the base number of clicks on engine $c\_i$ on BASE_OCC (block 928). Queries with low frequency tend to have large swings in their values. For example, the probability of a concept block with three occurrences is not as reliable as the probability of a concept block with 300 occurrences. To solve this problem, the method 900 using block 928 can be used. BASE_OCC may be chosen based on the data distribution and may be uniform across all the channels. BASE_CLICK($c\_i$) is computed based on the historical click data.

In yet another embodiment, the method 900 continues by for any set of concept blocks, U, the probability of a channel click if a query contains all the concept blocks in U is P_CL(q, $c\_i$) as SUM(P_CL (u, $c\_i$) for all u in U (block 932). The method 900 continues with block 932 when concept blocks are used. Block 932 computes the channel relevancy degree of the query by aggregating the channel click probability of its components (e.g., concept blocks). The SUM function used is a weighted function. For example, special phrases have very large weights and the tri-grams have larger weights than bi-grams and words; and bi-grams have larger weights than words.

Figure 10:
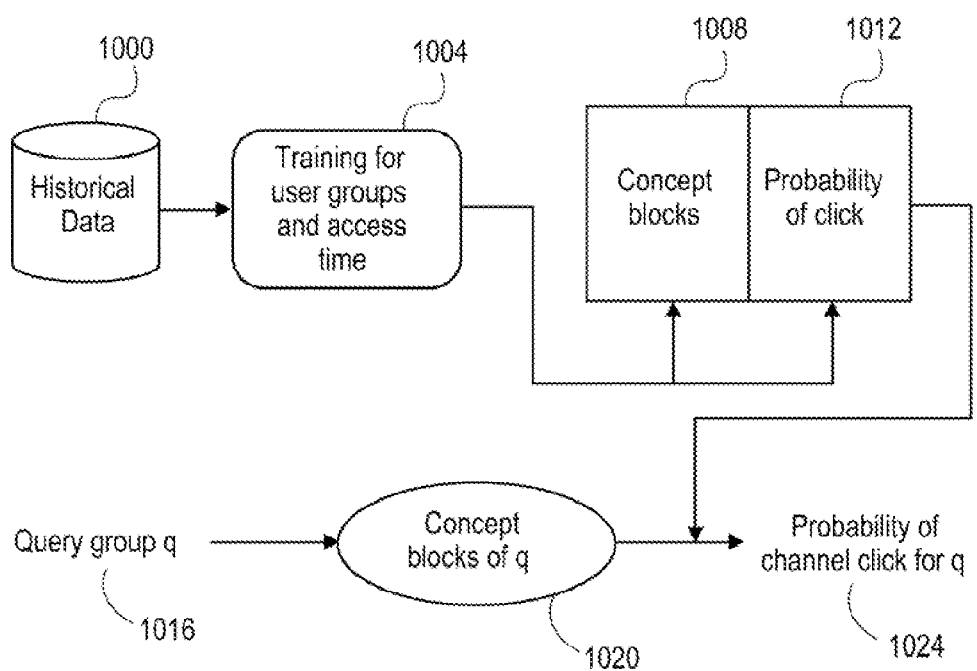
FIG. 10 is a block diagram of a method for aggregating channel click probability of components of a query in accordance with one embodiment of the invention.

FIG. 10 schematically illustrates the flow of the process within the system. Historical data 1000 is used as training for user groups and access time 1004. Concept blocks 1008 and probability of click 1012 are determined. A query group q 1016 is analyzed to determine the concept blocks of q 1020. The probability of the channel click for q 1024 is determined based on the concept blocks of q 1020 and the concept blocks 1008 and probability of click 1012.

Figure 11:
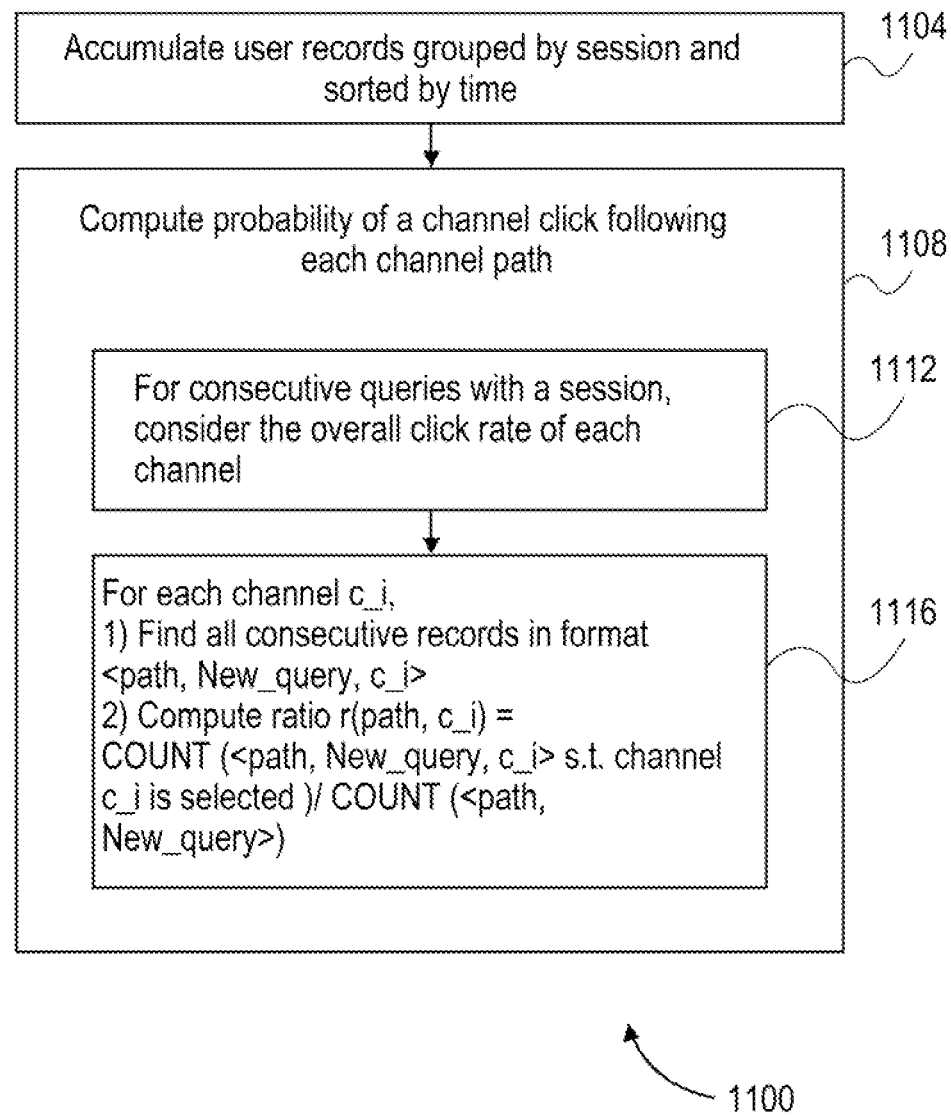
FIG. 11 is a block diagram of a method of classifying channel paths in accordance with one embodiment of the invention.

FIG. 11 illustrates a method 1100 for classifying channel paths in accordance with one embodiment of the invention. The classifier computes the likelihood of clicking a specific channel after a user has accessed other channels. There is a strong preference among users in the order of using different channels. For example, generally, if a user chooses a channel, the user is more likely to choose the same channel again in the immediate future. In another example, some channels complement each other or offer similar content. For example, a channel that shows reviews of a product is related to a channel that shows the stores the product is sold. This classifier extracts the preferred user paths between channels using historical data.

The method 1100 begins by accumulating user records grouped by session and sorted by time (block 1104). The method 1100 continues by computing the probability of a channel click following each channel path (block 1108). The computation 1108 may include for consecutive queries with a session, considering the overall click rate of each channel (block 1112). The computation 1108 may also include for each channel $c\_i$, finding consecutive records in format <path, New_query, $c\_i$>, and computing the ratio $r(path, c\_i)$ =COUNT(<path, New_query, $c\_i$>) s.t. channel $c\_i$ is selected/COUNT<path, New_query>) (block 1116). The ratio $r(path, c\_i)$ measures the tendency of a user who followed the path to select channel $c\_i$ on the next query. The r values are stored, and when a user performs a new query, the path(s) corresponding to r are fetched.

Figure 12:
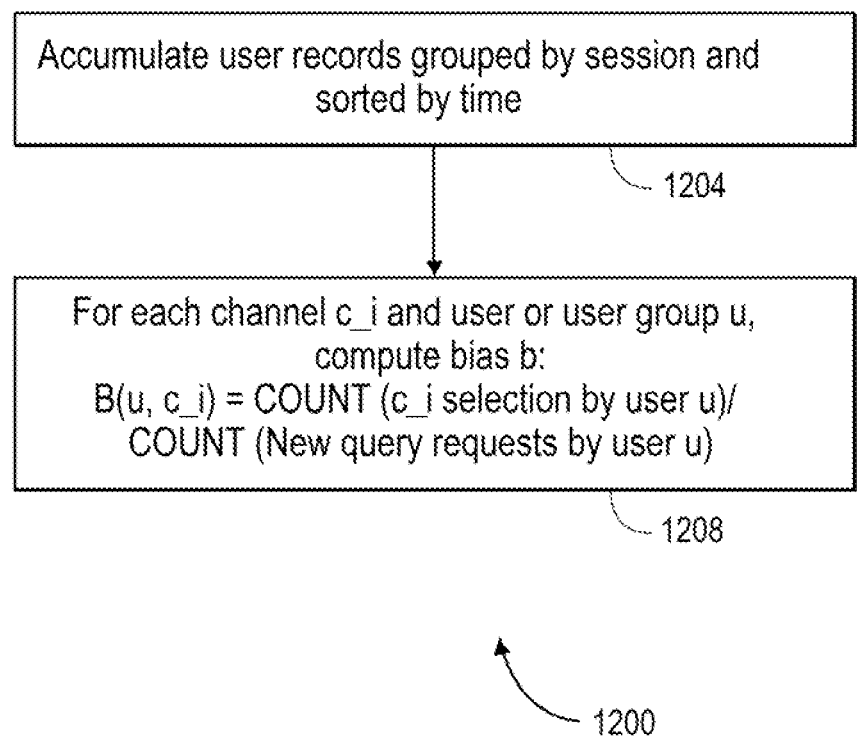
FIG. 12 is a block diagram of a method of classifying user bias in accordance with one embodiment of the invention.

FIG. 12 illustrates a method for user biased classification 1200 in accordance with one embodiment of the invention. This classifier is to derive the aggregative behavior of a user or a user group at a certain time range or following a certain event. The classifier determines if a user or a user group has a bias using or not using certain channels under such a temporal condition.

The method 1200 begins by accumulating user records grouped by session and sorted by time (block 1204). The method 1200 continues by for each channel $c\_i$ and user or user group u, computing bias b with the following expression: $B(u, c\_i)$=COUNT ($c\_i$ selection by user u)/COUNT (New query results by user u) (block 1208). These bias b values are stored for users and channels and the bias b values are then used to make channel information determinations.

Figure 13:
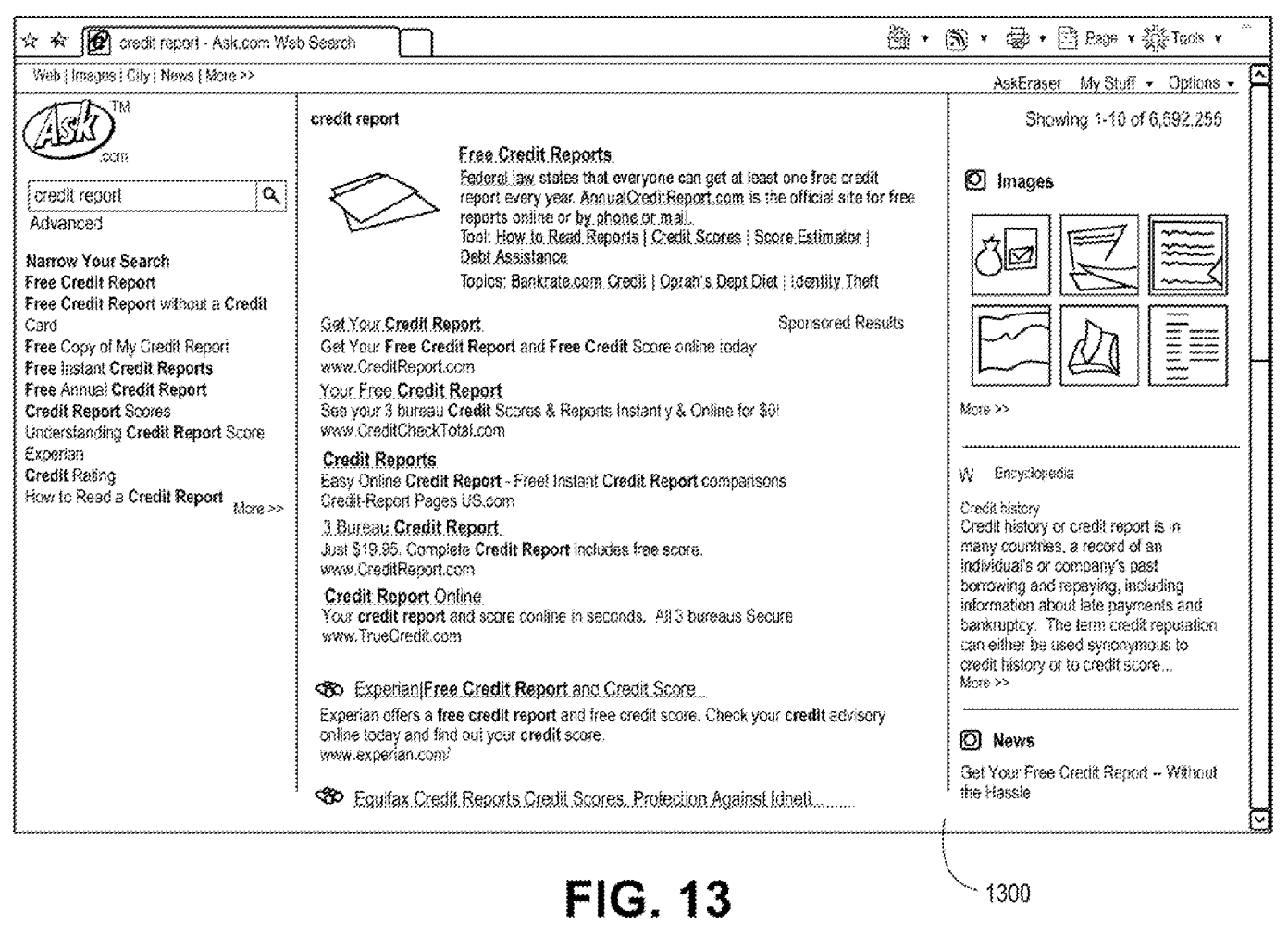

FIG. 13 is an exemplary user interface 1300 illustrating a search results page including optimized channel selection in accordance with one embodiment of the invention. FIG. 13 illustrates a search results page for a search query for "credit report." The channels that are illustrated for a "credit report" query include: five sponsored results, six images, one encyclopedia entry and one news entry.

Figure 14:
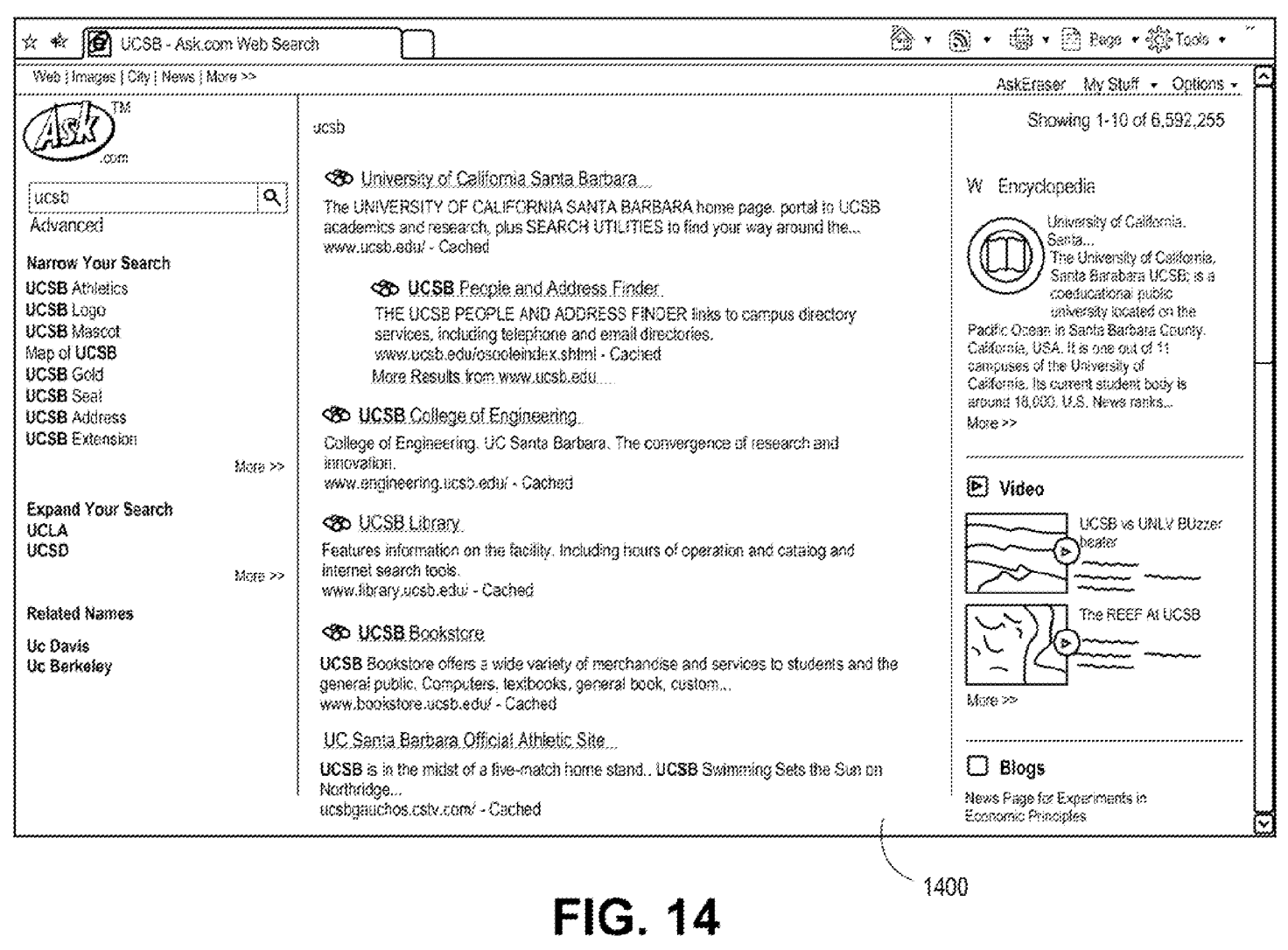

FIG. 14 is an exemplary user interface 1400 illustrating a search results page including optimized channel selection in accordance with one embodiment of the invention. FIG. 14 illustrates search results for a search query that is "ucsb." For example, the channels for the search "ucsb" include no sponsored results, one encyclopedia entry, two videos and one blog.

When the user interfaces 1300 and 1400 of FIGS. 13 and 14, respectively, are compared, it can be seen that different amounts and types of information content from different channels are presented for different search queries.

As described above, the channels are picked and the amount of content is determined based on an analysis of the query or query concept blocks, user history and time. The web search engine determines how to display the results page based on the channel recommendation provided by the channel recommendation system and the web search results.

Figure 15:
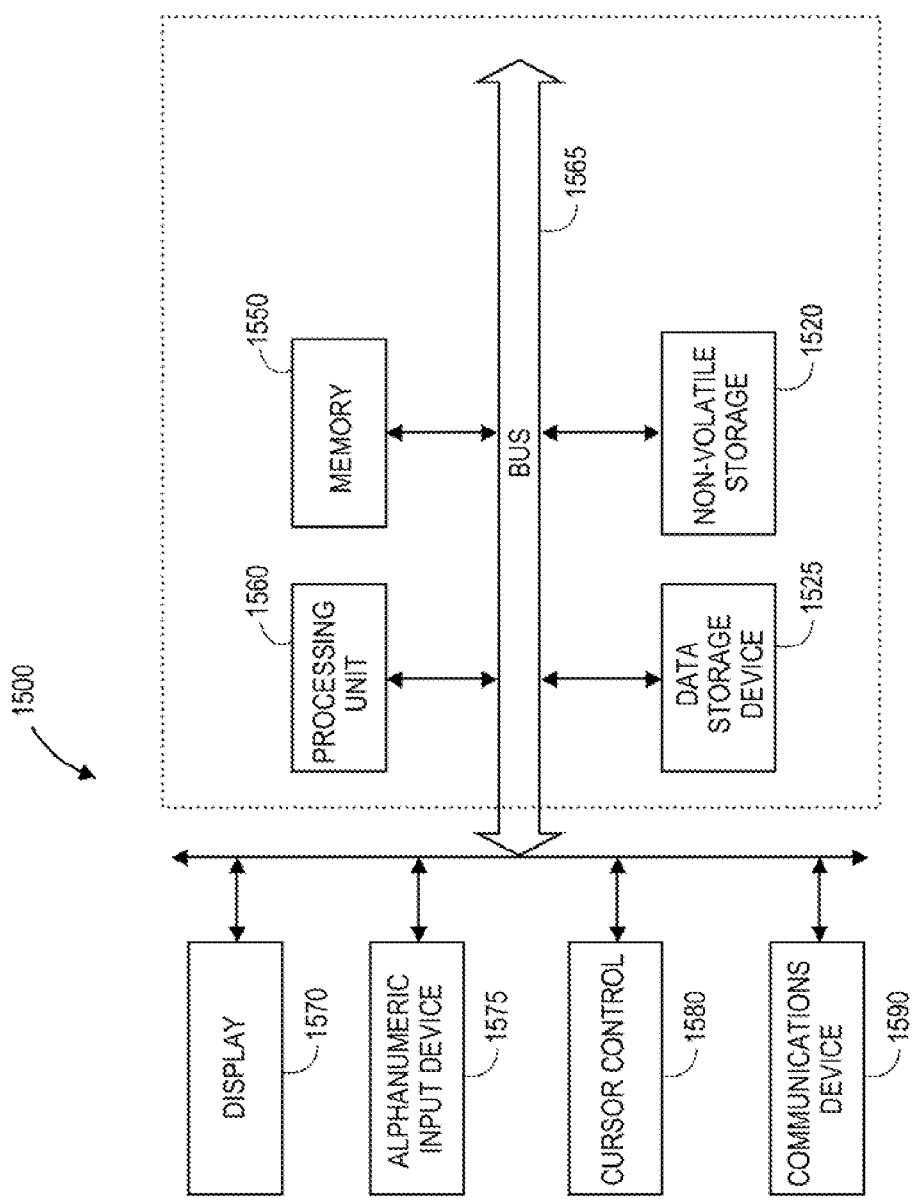
FIG. 15 is a block diagram of an exemplary computer system in accordance with one embodiment of the invention.

FIG. 15 is one embodiment of a computer system on which embodiments of the present invention may be implemented. It will be apparent to those of ordinary skill in the art, however, that other alternative systems of various system architectures may also be used.

The data processing system illustrated in FIG. 15 includes a bus or other internal communication means 1565 for communicating information, and a processor 1560 coupled to the bus 1565 for processing information. The system further comprises a random access memory (RAM) or other volatile storage device 1550 (referred to as memory), coupled to bus 1565 for storing information and instructions to be executed by processor 1560. Main memory 1550 also may be used for storing temporary variables or other intermediate information during execution of instructions by processor 1560. The system also comprises a read only memory (ROM) and/or static storage device 1520 coupled to bus 1565 for storing static information and instructions for processor 1560, and a data storage device 1525 such as a magnetic disk or optical disk and its corresponding disk drive. Data storage device 1525 is coupled to bus 1565 for storing information and instructions.

The system may further be coupled to a display device 1570, such as a cathode ray tube (CRT) or a liquid crystal display (LCD) coupled to bus 1565 through bus 1565 for displaying information to a computer user. An alphanumeric input device 1575, including alphanumeric and other keys, may also be coupled to bus 1565 through bus 1565 for communicating information and command selections to processor 1560. An additional user input device is cursor control device 1580, such as a mouse, a trackball, stylus, or cursor direction keys coupled to bus 1565 through bus 1565 for communicating direction information and command selections to processor 1560, and for controlling cursor movement on display device 1570.

Another device, which may optionally be coupled to computer system 1500, is a communication device 1590 for accessing other nodes of a distributed system via a network. The communication device 1590 may include any of a number of commercially available networking peripheral devices such as those used for coupling to an Ethernet, token ring, Internet, or wide area network. The communication device 1590 may further be a null-modem connection, or any other mechanism that provides connectivity between the computer system 1500 and the outside world. Note that any or all of the components of this system illustrated in FIG. 15 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1550, mass storage device 1525, or other storage medium locally or remotely accessible to processor 1560.

It will be apparent to those of ordinary skill in the art that the system, method, and process described herein can be implemented as software stored in main memory 1550 or read only memory 1520 and executed by processor 1560. This control logic or software may also be resident on an article of manufacture comprising a computer readable medium having computer readable program code embodied therein and being readable by the mass storage device 1525 and for causing the processor 1560 to operate in accordance with the methods and teachings herein.

The present invention may also be embodied in a handheld or portable device containing a subset of the computer hardware components described above. For example, the handheld device may be configured to contain only the bus 1565, the processor 1560, and memory 1550 and/or data storage device 1525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1560, a data storage device 1525, a bus 1565, and memory 1550, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 1560. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. infrared signals, digital signals, etc.).

The foregoing description with attached drawings is only illustrative of possible embodiments of the described method and should only be construed as such. Other persons of ordinary skill in the art will realize that many other specific embodiments are possible that fall within the scope and spirit of the present idea. The scope of the invention is indicated by the following claims rather than by the foregoing description. Any and all modifications which come within the meaning and range of equivalency of the following claims are to be considered within their scope.

The invention claimed is:

1. A method implemented by at least a computer system for adaptive multi-channel content selection with behavior-aware query analysis comprising:
   receiving a search query from a user;
   determining, for each of a plurality of channels wherein each channel has a plurality of web results, a probability that the user will select a web result of the channel for the search query;
   making at least one selection decision among the plurality of channels based on corresponding probabilities that the user will select a respective web result of at least a respective channel based on historical data of the user, wherein
   the historical data comprises past click results and access time range associated with the query, and
   the selection decision comprises at least selecting channel placement of the at least respective channel for presentation to the user;
   determining an optimal number of web results to display for each of the plurality of channels based at least in part on the corresponding probabilities that the user will select the respective web result of the at least respective channel based on the historical data for each channel and the search query; and
   presenting a number of web results to the user, a wherein the number of web results displayed for each of the plurality of channels being based on the optimal number determined for each of the plurality of channels.

2. The method of claim 1, wherein the time range comprises an event.

3. The method of claim 1, further comprising:
   storing historical data of queries and selections; and
   analyzing the historical data based on the search query and the user to determine the probability for each channel.

4. The method of claim 1, further comprising:
   identifying query concepts from the search query;
   analyzing the historical data based on each of the query concepts to determine a recommended channel selection; and
   aggregating the recommended channel selection for each of the query concepts.

5. The method of claim 1, wherein the selection decision comprises dynamically determining a recommended channel selection.

6. The method of claim 1, further comprising:
   if the historical data cannot be analyzed then the determining the probability for each channel is implemented by:
   partitioning the received search query to identify concept blocks;
   classifying each concept block to determine a classification decision;
   aggregating the classification decision of each concept block; and
   computing a channel relevancy for the received search query.

7. The method of claim 1, further comprising:
   tracking and mining historical user data associated with a plurality of data channels;
   tracking and mining relevancy information appropriate of each data channel based on historical data of each user;
   tracking and mining relevancy information appropriate of each data channel for a given query and user or group of queries and users;
   tracking and mining click paths among the plurality of channels;
   classifying query-channel relevancy, user past interests, and channel usage patterns;
   collecting data for instant recommendation of channel sources based on classification results; and
   optimizing channel placement for best retention and pick rates for targeted.

8. A computer implemented adaptive multi-channel content selection system comprising:
   a computer memory for storing a set of instructions;
   a computer processor connected to the memory;
   a web search engine module stored in the computer memory and executable by the computer processor to receive a search query from a user and present web results corresponding to the search query to the user; and a channel selection system module stored in the computer memory and executable by the computer processor to:
 (i) determine, for each of a plurality of channels wherein each channel has a plurality of web results, a probability that the user will select a web result of the channel for the search query,
 (ii) make at least one selection decision among the plurality of channels based on corresponding probabilities that the user will select a respective web result of at least a respective channel based on historical data of the user, wherein
  the historical data comprises past click results and access time range associated with the query, and
  the selection decision comprises at least selecting channel placement of the at least respective channel for presentation to the user and
 (iii) determine an optimal number of the web results to display for each of the plurality of channels based at least in part on the corresponding probabilities that the user will select the respective web result of the at least respective channel based on the historical data for each channel and the search query, and
 (iv) display a number of the web results to the user, wherein the number being based on the optimal number determined for each of the plurality of channels.

9. The system of claim 8, further comprising a plurality of databases located in the computer memory, the plurality of databases coupled with the web search engine module.

10. The system of claim 8, further comprising:
a plurality of database records consisting of multi-channel content;
a user-centric database, consisting of user centric click records, the click records used as training data to develop independent classifiers;
a query-channel relevancy classifier configured to analyze categorization of queries into groups and identify a relevancy degree of each channel's content to a search query or class of queries;
a channel-path classifier configured to determine an access path from one channel to another;
a user-bias classifier configured to analyze user search habits pertaining to the multi-channel content; and
a recommendations aggregator configured to collect database records from multi-channel content sources based on the classification results from the query-channel classifier, channel-path classifier and user-bias classifier.

* * * * *